United States Patent [19]
Cheng et al.

[11] Patent Number: 5,998,514
[45] Date of Patent: Dec. 7, 1999

[54] RANDOM VINYL SUBSTITUTED AROMATIC/$C_4$-$C_6$ CONJUGATED DIOLEFIN POLYMER MODIFIED ASPHALT MIXTURES

[75] Inventors: John Tze-Chiang Cheng; Heinz Plaumann; Koichi Takamura; Arthur Barry Baughman, all of Charlotte, N.C.

[73] Assignee: BASF Corporation, Mt. Olive, N.J.

[21] Appl. No.: 09/215,622

[22] Filed: Dec. 17, 1998

[51] Int. Cl.⁶ .................................................. C08L 95/00
[52] U.S. Cl. ............................................. 524/71; 524/68
[58] Field of Search .................................. 524/71, 68, 59

[56] References Cited

U.S. PATENT DOCUMENTS

| | | | |
|---|---|---|---|
| 2,972,588 | 2/1961 | Cohen | 524/60 |
| 3,414,533 | 12/1968 | Trieschmann | 524/62 |
| 3,951,895 | 4/1976 | Anthenien et al. | 524/60 |
| 3,980,598 | 9/1976 | Moorwessel et al. | 524/69 |
| 4,018,730 | 4/1977 | McDonald | 52/43 |
| 4,222,916 | 9/1980 | Hergenrother | 524/66 |
| 4,333,866 | 6/1982 | Uffner | 524/534 |
| 4,492,781 | 1/1985 | Duszak et al. | 524/59 |
| 4,511,689 | 4/1985 | Aldred | 524/484 |
| 4,772,647 | 9/1988 | Grossi et al. | 524/68 |
| 5,331,028 | 7/1994 | Goodrich | 524/68 |
| 5,451,619 | 9/1995 | Kluttz et al. | 523/450 |
| 5,574,095 | 11/1996 | van der Werff | 524/54.5 |
| 5,604,274 | 2/1997 | Gallagher et al. | 524/67 |
| 5,672,642 | 9/1997 | Gros | 524/68 |
| 5,710,196 | 1/1998 | Willard | 524/68 |
| 5,733,955 | 3/1998 | Schulz et al. | 524/69 |

*Primary Examiner*—Peter A. Szekely

[57] ABSTRACT

The present invention relates to random vinyl substituted aromatic/$C_4$–$C_6$ conjugated diolefin polymer modified asphalt mixtures wherein the modifier is a keto-containing amide such as diacetone acrylamide (DAAM), an oxazoline containing copolymer, and an ethoxylated trimethylolpropane triacrylate.

6 Claims, No Drawings

RANDOM VINYL SUBSTITUTED AROMATIC/$C_4$-$C_6$ CONJUGATED DIOLEFIN POLYMER MODIFIED ASPHALT MIXTURES

FIELD OF THE INVENTION

The present invention relates to random vinyl substituted aromatic/$C_4$-$C_6$ conjugated diolefin polymer modified asphalt mixtures wherein the modifier is a keto-containing amide such as diacetone acrylamide (DAAM), an oxazoline containing copolymer, or an ethoxylated trimethylolpropane triacrylate. Said modified asphalt has improved high and low temperature properties such as rutting resistance and resistance to cold fracture.

BACKGROUND OF THE INVENTION

Modified Styrene Butadiene Rubber (SBR) polymer/asphalt compositions are known to those skilled in the art. Polymer modified asphalt blends are useful for paving materials, roofing materials, products for protection of car bottoms and other coating applications. Asphalt/polymer blends must have good phase compatibility between the asphalt and the polymer, and must be storage stable at high temperatures for ease of handling and application. Specifically, U.S. Pat. No. 4,333,866 discloses a rubber modified asphalt composition containing styrene butadiene rubber (SBR) and asphalt and a vinyl aromatic monomer such as cinnamic acid. U.S. Pat. No. 5,451,619 discloses an asphalt composition containing styrene butadiene rubber which is epoxidized. Said composition is said to exhibit better compatibility than previous polymer modified compositions. U.S. Pat. No. 5,604,274 discloses a blend of asphalt and epoxy functionalized polymer. Styrene/butadiene rubber is not disclosed as part of the composition. U.S. Pat. No. 5,574,095 discloses an asphalt composition containing epoxy or glycidyl functional polymers. Styrene/butadiene is not disclosed as part of the composition. U.S. Pat. No. 5,672,642 discloses a process for preparing asphalt polymer blends comprising contacting sulfur with asphalt and contacting a polymer with the sulfur asphalt mixture. The preferred polymer is a styrene-butadiene-styrene block copolymer. U.S. Pat. No. 5,331,028 discloses a rubber modified composition containing block styrene butadiene rubber, asphalt and a glycidyl containing ethylene copolymer wherein the glycidyl moiety refers to an epoxide containing functionality. Finally, U.S. Pat. No. 4,772,647 discloses aqueous asphaltic emulsions wherein the asphaltic component is either a chemically modified asphalt or an asphalt-elastomer blend, and the aqueous component contains an acrylamide as an additive. Either type of emulsion can be utilized as a coating composition, i.e., as a basement waterproofing spray, or as a crack filler for highway and related uses. U.S. Pat. No. 5,710,196 discloses an asphalt composition comprising:

(i) an asphalt and
(ii) a graft copolymer resin comprising a rubbery polymeric substrate and a rigid polymeric substrate, wherein the rubbery substrate and rigid substrate optionally contain acrylamide.

U.S. Pat. No. 5,733,955 discloses that rubbery terpolymers of a conjugated diolefin monomer (butadiene), a vinyl aromatic monomer (styrene), a N-(isobutoxymethyl) acrylamide (IBMA) can be used to modify asphalt cement to greatly enhance the resistance to shoving, rutting, and low temperature cracking of asphalt concretes. U.S. Pat. No. 5,047,457 discloses an acrylate modified asphalt composition. Further, a number of patents cited therein describe the modification of the asphalt mixtures with, copolymers and interpolymers of alkyl acrylates and alkyl methacrylates with olefinic monomers such as ethylene, e.g. U.S. Pat. Nos. 2,972,588; 3,414,533; 3,980,598; 4,492,781; and 4,511,689.

The use of acrylates as asphalt modifiers is also disclosed in U.S. Pat. No. 3,951,895, U.S. Pat. No. 4,018,730 and U.S. Pat. No. 4,222,916. U.S. Pat. No. 3,951,895 describes asphaltic compounds for use in paving and roofing in which an acrylic emulsion of a copolymer of methyl methacrylate and ethylacrylate is mixed with 1 to 3 parts of hydrated lime and 40 parts of sand. This acrylic emulsion then is blended with an asphalt emulsion. U.S. Pat. No. 4,018,730 describes methods for emulsifying asphalt-rubber paving materials. The rubber materials which may be included in the asphalt paving material include a wide variety of natural as well as synthetic rubbers including acrylic rubber. U.S. Pat. No. 4,222,916 describes coal tar emulsions containing sufficient acrylate emulsions to provide a desired viscosity. The acrylate emulsion is exemplified by butyl acrylate.

Surprisingly, Applicants have discovered a polymer modified asphalt hot mix system wherein the modifier is a keto-containing amide functional monomer, such as diacetone acrylamide (DAAM), or an oxazoline containing copolymer, or an ethoxylated trimethylolpropane triacrylate, or mixtures thereof.

DEFINITIONS AND USAGES OF TERMS

The term "random copolymer," as used herein, means a polymer in which the monomeric units comprising said polymer are randomly arranged.

The term "block copolymer," as used herein, means a polymer in which the monomeric units comprising said polymer are arranged in blocks, e.g. [styrene-butadiene-styrene]-[styrene-butadiene-styrene].

The term "keto-containing amide," as used herein, means a compound having the following general structure:

$CH_2$=$CR_1C(O)NR_2C(O)R_3$

Wherein $R_1$=H or $CH_3$, $R_2$=H , $C_{1-4}$ alkyl group or a phenyl group, $R_3$=H, $C_{1-4}$ alkyl group or a phenyl group A preferred keto-containing amide is diacetone acrylamide (DAAM).

The term "oxazoline containing copolymer," as used herein, means oligomers or copolymers having the oxazoline group or functionality.

Oxazoline is represented by the formula:

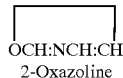

OCH:NCH:CH
2-Oxazoline

The term "ethoxylated trimethylolpropane triacrylate," as used herein, means a modified trifunctional derivative compound based on acrylate chemistry having the general formula:

[$H_2C$=$CHC(O)O(CH_2CH_2O)_nCH_2]_3CCH_2CH_3$ wherein n=10–30, preferably n=20.

SUMMARY

A random vinyl substituted aromatic/$C_4$–$C_6$ conjugated diolefin polymer/asphalt composition comprising:

(a) 1 to 30% random vinyl substituted aromatic/$C_4$–$C_6$ conjugated diolefin polymer (b) 70 to 99% asphalt; and (c) 0.1 to 10% of a modifier selected from the group consisting of keto-containing amides, an oxazoline containing copolymer, or an ethoxylated trimethylolpropane triacrylate or mixtures thereof.

DETAILED DESCRIPTION

A random vinyl substituted aromatic/$C_4$–$C_6$ conjugated diolefin polymer/asphalt composition comprising:

(a) 1 to 30% random vinyl substituted aromatic/$C_4$–$C_6$ conjugated diolefin polymer (b) 70 to 99% asphalt; and (c) 0.1 to 10% of a modifier selected from the group consisting of keto-containing amides, an oxazoline containing copolymer, or an ethoxylated trimethylolpropane triacrylate or mixtures thereof.

The Preparation of the Present Invention

Without intending to be limited, the present invention can be practiced accordingly. The modifier, e.g. DAAM, is first added to the hot asphalt at a temperature of 110° to 170° C., followed by the addition of the random vinyl substituted $C_4$–$C_6$ conjugated diolefin polymer. The temperature of this admixture is raised to or kept at 170° C. and held for two (2) hours under moderate agitation (300–500 rpm). The high temperature property is evaluated by Dynamic Shear Rheometer (DSR) where the phase angle ($\delta$) and the complex modulus term (G*/sin $\delta$) are determined by AASHTO TP-5-93. The temperature is recorded every six degrees until the G*/sin $\delta$ reaches <1 KPa. For the low temperature property, the Bending Beam Rheometer (BBR) is used from which the temperature is determined when the m value, which is the slope of log creep stiffness vs. log loading time, reaches 0.30 at a time of 60 seconds. The m value represents the rate of change of the stiffness versus time under load.

TABLE 1

| | | G*/sin $\delta$, KPa | | | | |
|---|---|---|---|---|---|---|
| | | 64° C. | 70° C. | 76° C. | 82° C. | 88° C. |
| | Modifier DAAM, % | | | | | |
| Cenex AC20 | 0.0 | 3.68 | 1.84 | 0.99 | — | — |
| NS175-3.0% | 0.15 | 2.60 | 1.29 | 0.69 | — | — |
| | 0.30 | 3.39 | 1.89 | 1.11 | 0.68 | — |
| | 0.45 | 4.45 | 3.00 | 2.02 | 1.45 | 1.06 |
| AAB1 | 0.0 | 2.50 | 1.30 | 0.72 | — | — |
| NS175-3.5% | 0.0 | 2.15 | 1.10 | 0.62 | — | — |
| NS175-3.0% | 0.15 | 2.53 | 1.32 | 0.72 | — | — |
| | 0.30 | 3.47 | 2.53 | 1.98 | 1.65 | 1.46 |
| | 0.45 | 1.78 | 0.89 | — | — | — |
| | Modifier WS500, % | | | | | |
| AAB1 | 0.0 | 2.15 | 1.10 | 0.62 | — | — |
| NS175-3.0% | 0.25 | 1.95 | 1.04 | 0.59 | — | — |

TABLE 1-continued

| | | G*/sin $\delta$, KPa | | | | |
|---|---|---|---|---|---|---|
| | | 64° C. | 70° C. | 76° C. | 82° C. | 88° C. |
| | 0.50 | 2.36 | 1.53 | 1.04 | 0.73 | — |
| | 0.75 | 3.03 | 2.33 | 1.80 | 1.50 | 1.26 |
| | Modifier SR415, % | | | | | |
| AAB1 | 0.0 | 2.15 | 1.10 | 0.62 | — | — |
| NS175-3.0% | 0.75 | 2.09 | 1.28 | 0.86 | — | — |
| | 1.00 | 3.20 | 2.05 | 1.42 | 1.05 | 0.85 |

Key to Table

CenexAC20 is a type of asphalt available from Canada, the asphaltene (N-Heptane) content is in the range of 4–17%.

NS 175-3% is styrene-butadiene random copolymer with 25% styrene and a Tg (glass transition phase) of –56° C. available from BASF under the trade name of BUTONAL®.

AAB1 is a type of asphalt. AAB1 asphalt is the crude from Wyoming source with the following characteristics:

| | |
|---|---|
| 60° C. viscosity | 1029 poise |
| Asphaltenes (N-Heptane) | 17.3% |
| Polar Aromatics | 38.3% |
| Napthene Aromatics | 33.4% |
| Saturates | 8.6% |

Modifier WS500 is an oxazoline containing polymer available from Aceto Corporation.

Modifier SR415 is an ethoxylated trimethylolpropane triacrylate available from Sartomer Company.

G*/sin $\delta$ means complex shear modulus divided by sin phase angle.

Complex shear modulus is a measure of the total resistance of a material to deforming when repeatedly sheared. The phase angle is an indicator of the relative amounts of recoverable (i.e., reversible) and non-recoverable (i.e., non-reversible) deformation.

KPa means kilo Pascal, a unit related to modulus.

AASHTO TP-5-93 means American Association of State Highway Transportation Officials, text number TP-5-93.

Table 1 illustrates the utility of the present invention, in that the modulus is maintained over a wide range of temperature due to the addition of DAAM, WS500 and SR415.

The Random Vinyl Substituted Aromatic/$C_4$–$C_6$ Conjugated Diolefin Polymers The random vinyl substituted aromatic/$C_4$–$C_6$ conjugated diolefin polymer suitable for use in the present invention is comprised from about 65 to 85% by weight of at least one conjugated $C_4$–$C_6$ diolefin and from about 15–35% by weight of a vinyl substituted aromatic. Styrene/Butadiene rubber (SBR) is the preferred random vinyl substituted aromatic/$C_4$–$C_6$ conjugated diolefin polymer.

The random vinyl substituted aromatic/$C_4$–$C_6$ conjugated diolefin polymer is used at levels of 1 to 30% in the polymer/asphalt composition of the present invention, more preferably 1 to 15%, and most preferably 2 to 5% in the polymer/asphalt composition of the present invention.

Asphalt

The asphalt suitable for use in the present invention is described in U.S. Pat. No. 5,672,642, column 1, lines 60–67 and column 2, lines 1–25, incorporated by reference herein. The asphalt is used at levels of 70 to 99% preferably 90 to 99% and most preferably 95 to 99% in the polymer/asphalt composition of the present invention.

Modifiers

The modifiers useful in the present invention are selected from the group consisting of Keto-containing amides, oxazoline containing copolymers, and ethoxylated trimethylolpropane triacrylate.

Keto-containing Amides

The modifiers useful in the present invention are selected from the group consisting of Keto-containing amides, such as diacetone acrylamide (DAAM), and diacetophenone. DAAM is the preferred Keto-containing amide.

The preferred level of DAAM is 0.1 to 10% in the polymer/asphalt composition of the present invention. The more preferred level of DAAM is 0.1 to 5% in the polymer/asphalt composition of the present invention. The most preferred level of DAAM is 0.5 to 2.5% in the polymer/asphalt composition of the present invention.

Oxazoline Containing Copolymers

The preferred level of oxazoline containing copolymer is 0.1 to 10% in the polymer/asphalt composition of the present invention.

The more preferred level of oxazoline containing copolymer is 0.1 to 5% in the polymer/asphalt composition of the present invention.

The most preferred level of oxazoline containing copolymer is 0.1 to 3% in the polymer/asphalt composition of the present invention.

Ethoxylated Trimethylolpropane Triacrylate

The preferred level of ethoxylated trimethylolpropane triacrylate is 0.1 to 10% in the polymer/asphalt composition of the present invention.

The more preferred level of ethoxylated trimethylolpropane triacrylate is 0.1 to 5% in the polymer/asphalt composition of the present invention.

The most preferred level of ethoxylated trimethylolpropane triacrylate is 0.5 to 2.5% in the polymer/asphalt composition of the present invention.

SR415, which is an ethoxylated trimethylolpropane triacrylate modifier, is the most preferred modifier. Specifically, SR415 has the formula:

[H$_2$C=CHC(O)O(CH$_2$CH$_2$O)$_n$CH$_2$]$_3$CCH$_2$CH$_3$, wherein n=10–30, preferably n=20.

THE UTILITY OF THE PRESENT INVENTION

The following non-limiting examples illustrate the utility of the present invention.

EXAMPLE 1

A 388.0 g CENEX® AC 20 asphalt was charged into the reactor, which was immersed in an oil bath equipped with agitator and temperature control. The asphalt was heated to 170° C. at 300 rpm, 1.8 g of DAAM and 16.8 g. (71.3% solid) of BUTONAL® NS175 latex were added separately and simultaneously into the reactor while the agitation was increased to 700 rpm. At the end of addition (10–15 minutes), the hot admixture was under reduced agitation of 400 rpm, and held at 170° C. for an additional two hours. The admixture was then tested for modulus and phase angle as a function of temperature until reaching 1 KPa by DSR. The temperature at which the G*/sin δ reached 1 KPa was found to be >88° C., compared with the control (no DAAM) of 76° C. No adverse effect on low temperature was observed—the temperature at m=0.3 was about −16° C. compared with the control without DAAM of −14° C.

EXAMPLE 2

A 388.0 g AAB1 asphalt was charged into the reactor, which was immersed in an oil bath equipped with agitator and temperature control. The asphalt was heated to 170° C. at 300 rpm, 5.8 g of EPOCROSS® WS500 (oxazoline functional polymer) (52%solid) and 16.8 g. (71.3% solid) of BUTONAL® NS175 latex were added separately and simultaneously into the reactor while the agitation was increased to 700 rpm. At the end of addition (10–15 minutes), the hot admixture was agitated at 400 rpm, and held at 170° C. for an additional two hours. The admixture was then tested for modulus and phase angle as a function of temperature until reaching 1 KPa by DSR. The temperature at which the G*/sin δ reached 1 KPa was found to be >88° C., compared with the control (no WS500) of 71° C. The temperature at m=0.3 was found to be −14° C. compared with the control without WS500® of −12° C.

EXAMPLE 3

A 388.0 g AAB1 asphalt was charged into the reactor, which was immersed in an oil bath equipped with agitator and temperature control. The asphalt was heated to 170° C. at 300 rpm, 4.0 g of SR415 (ethoxylated trimethylolpropane triacrylate) and 16.8 g. (71.3% solid) of BUTONAL® NS175 latex were added separately and simultaneously into the reactor while the agitation was increased to 700 rpm. At the end of addition (10–15 minutes), the hot admixture was under reduced agitation of 400 rpm, and held at 170° C. for an additional two hours. The admixture was then tested for modulus and phase angle as a function of temperature until reaching 1 KPa by DSR. The temperature at which the G*/sin δ reached 1 KPa was found to be 84° C., compared with the control (no SR415) of 71° C. The temperature at m=0.3 was found to be −15° C. compared with the control without SR415 of −12° C.

EXAMPLE 4

A 388.0 g AAB1 asphalt was charged into the reactor, which was immersed in an oil bath equipped with agitator and temperature control. The asphalt was heated to 170° C. at 300 rpm, 1.2 g of DAAM and 16.8 g. (71.3% solid) of BUTONAL® NS175 latex were added separately and simultaneously into the reactor while the agitation was increased to 700 rpm. At the end of addition (10–15 minutes), the hot admixture was under reduced agitation of 400 rpm, and held at 170° C. for an additional two hours. The admixture was then tested for modulus and phase angle as a function of temperature until reaching 1 KPa by DSR. The temperature at which the G*/sin δ reached 1 KPa was found to be >84° C., compared with the control (no DAAM) of 71° C. The temperature at m=0.3 was found to be −15° C. compared with the control without DAAM of −17° C.

We claim:

1. A random vinyl substituted aromatic/C$_4$–C$_6$ conjugated diolefin polymer/asphalt composition comprising:
   (a) 1 to 30% random vinyl substituted aromatic/C$_4$–C$_6$ conjugated diolefin polymer
   (b) 70 to 99% asphalt; and
   (c) 0.1 to 10% of a modifier selected from the group consisting of keto-containing amides, an oxazoline containing copolymer, or an ethoxylated trimethylolpropane triacrylate or mixtures thereof.

2. A composition according to claim 1 wherein the modifier is ethoxylated trimethylolpropane triacrylate.

3. A composition according to claim 1 wherein the Keto-containing amide modifier is diacetone acrylamide.

4. A composition according to claim 1 wherein the random vinyl substituted aromatic/$C_4$–$C_6$ conjugated diolefin polymer is styrene/butadiene.

5. A composition according to claim 4, wherein the modifier is ethoxylated, trimethylolpropane triacrylate.

6. A composition according to claim 4 wherein the modifier is diacetone acrylamide.

* * * * *